(12) United States Patent
St. Clergy et al.

(10) Patent No.: US 8,608,405 B2
(45) Date of Patent: Dec. 17, 2013

(54) METHODS FOR DISPOSING OF PRODUCED WATER RECOVERED DURING HYDROCARBON DRILLING, PRODUCTION OR RELATED OPERATIONS

(75) Inventors: John St. Clergy, Spring, TX (US); Freddie L. Toney, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 360 days.

(21) Appl. No.: 12/953,981

(22) Filed: Nov. 24, 2010

(65) Prior Publication Data

US 2012/0128424 A1    May 24, 2012

(51) Int. Cl.
*C04B 18/04* (2006.01)
*E21B 33/13* (2006.01)

(52) U.S. Cl.
USPC .................... 405/129.3; 166/294; 405/129.25

(58) Field of Classification Search
USPC .................. 405/129.3, 129.25; 588/252, 257; 166/292, 293
See application file for complete search history.

(56) References Cited

U.S. PATENT DOCUMENTS

| | | | |
|---|---|---|---|
| 2,191,312 A * | 2/1940 | Cannon | 507/139 |
| 3,376,146 A * | 4/1968 | Farris | 106/669 |
| 3,499,491 A | 3/1970 | Wyant et al. | |
| 4,208,217 A | 6/1980 | Anderson et al. | |
| 4,756,761 A * | 7/1988 | Philip et al. | 106/714 |
| 5,020,598 A * | 6/1991 | Cowan et al. | 166/293 |
| 5,108,226 A | 4/1992 | Jennings, Jr. | |
| 5,387,737 A | 2/1995 | Schmidt et al. | |
| 5,387,741 A | 2/1995 | Shuttle | |
| 5,439,056 A | 8/1995 | Cowan | |
| 5,961,438 A | 10/1999 | Ballantine et al. | |
| 6,745,856 B2 | 6/2004 | Simpson et al. | |
| 2007/0221376 A1 | 9/2007 | Solomon et al. | |
| 2008/0066652 A1 | 3/2008 | Fraser et al. | |
| 2008/0066654 A1 | 3/2008 | Fraser | |
| 2008/0066655 A1 | 3/2008 | Fraser | |
| 2008/0202752 A1 | 8/2008 | Lopez et al. | |

\* cited by examiner

*Primary Examiner* — Tara M. Pinnock
(74) *Attorney, Agent, or Firm* — E. Randall Smith; Jones & Smith, LLP

(57) ABSTRACT

In some embodiments, methods of disposing of produced water recovered during hydrocarbon drilling, production, transportation or storage operations include collecting produced water, mixing Type I Portland cement with produced water to form a cementitious slurry, introducing the cementitious slurry into an underground void and allowing the cementitious slurry to set and form cement.

20 Claims, No Drawings

METHODS FOR DISPOSING OF PRODUCED WATER RECOVERED DURING HYDROCARBON DRILLING, PRODUCTION OR RELATED OPERATIONS

FIELD OF THE DISCLOSURE

The present disclosure relates generally to the disposal of fluids recovered during hydrocarbon drilling, production or related operations.

BACKGROUND

Waste fluids, sometimes referred to as "produced water", "production fluid" and "wastewater", are commonly produced or recovered during hydrocarbon drilling, production or related operations (e.g. transportation, storage, etc.). These fluids may arise, for example, during well stimulation, acid flow back, initial well flow back, completions, acid mine drainage, pipeline maintenance or at another time during operations, and are referred to herein and in the appended claims as "produced water".

There is often a need to dispose of produced water, posing operational challenges in the oil and gas industry. Currently, produced water must be managed at the surface for processing, treatment and/or hauling to designated storage locations. These procedures are often expensive, time-consuming and complicated, expending valuable resources that could otherwise be directed to the primary mission of drilling, production or other operations.

It should be understood that the above-described discussion is provided for illustrative purposes only and is not intended to limit the scope or subject matter of this disclosure, the appended claims or the claims of any related patent application or patent. Thus, none of the appended claims or claims of any related patent application or patent should be limited by the above discussion or required to address, include or exclude the above-cited examples, features and/or disadvantages merely because of their mention above.

Accordingly, there exists a need for improved systems, apparatus and methods for disposing of produced water having one or more of the attributes, capabilities or features described below or in the subsequent sections of this disclosure; uses existing equipment or requires minimal retrofitting of existing equipment; eliminates or lessens the need for treatment of the produced water; eliminates or lessens the need for implementing flowback controls; solidifies the produced water; results in cement that can be used in subterranean well cementing, construction projects or other applications; results in cement placed in existing underground voids; is useful to seal abandoned coal mines that may be releasing fines to the environment; is cost-effective; is time efficient; is reliable; is easy to implement.

BRIEF SUMMARY OF THE DISCLOSURE

In some embodiments, the present disclosure involves a method of disposing of produced water recovered during hydrocarbon drilling, production, transportation or storage operations. The method includes collecting produced water. Type I Portland cement is mixed with produced water to form a cementitious slurry. The cementitious slurry is introduced into an underground void and allowed to set and form cement having a compressive strength of at least approximately 400 psi.

In various embodiments, the present disclosure involves a method of disposing of produced water recovered during hydrocarbon drilling, production or related operations. The produced water is collected and mixed with Type I Portland cement to form a cementitious slurry having a thickness that allows the cementitious slurry to be pumped into an underground void. The cementitious slurry is pumped into an underground void and allowed to set and form solid cement with approximately zero free water.

Accordingly, the present disclosure includes features and advantages which are believed to enable it to improve the field of technology relating to the handling, treatment or disposal of produced water recovered during hydrocarbon drilling, production or related operations. Characteristics and potential advantages of the present disclosure described above and additional potential features and benefits will be readily apparent to those skilled in the art upon consideration of the following detailed description.

DETAILED DESCRIPTION OF EXEMPLARY EMBODIMENTS

Characteristics and advantages of the present disclosure and additional features and benefits will be readily apparent to those skilled in the art upon consideration of the following detailed description of exemplary embodiments of the present disclosure. It should be understood that the description herein, being of example embodiments, is not intended to limit the claims of this patent application, any patent granted hereon or any patent or patent application claiming priority hereto. On the contrary, the intention is to cover all modifications, equivalents and alternatives falling within the spirit and scope of the relevant claims. Many changes may be made to the particular embodiments and details disclosed herein without departing from such spirit and scope.

As used herein and throughout various portions (and headings) of this patent application, the terms "invention", "present invention" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . " Further, reference herein and in the appended claims to components and aspects in a singular tense does not necessarily limit the present disclosure or appended claims to only one such component or aspect, but should be interpreted generally to mean one or more, as may be suitable and desirable in each particular instance.

In accordance with the present disclosure, a cementitious slurry is formed having one or more of the following properties: a pumpable thickness, the ability to set to a certain minimal hardness, approximately zero free water. In an exemplary embodiment, a cementitious slurry is formed by mixing Type I Portland cement with produced water. The exemplary cementitious slurry is formed with a thickness that allows the slurry to be pumped into an underground space, cavity or void. As used herein and in the appended claims, the term "underground void" means and includes any one or more subterranean areas, such as cavities, spaces, voids, well bores, pipelines and the like, which is accessible from the surface and can accommodate a cementitious slurry. The underground void may have any form and configuration. Some examples of underground voids that may be suitable in some applications are abandoned mine shafts or cavities, excavations, tunnels, pipelines, subterranean formations for wells and wells, such as water wells, injection wells, disposal wells and storage wells.

Still in accordance with an exemplary embodiment, the slurry is introduced into the underground void, such as by pumping. For example, the slurry may, in some scenarios, be pumped into an abandoned coal mine shaft or area. In such instances, after the slurry hardens to cement, it may provide the additional benefit of effectively sealing the mine from releasing fines into the environment. Any suitable equipment may be used for mixing and delivering the slurry, such as conventional or commercially available containers, mixers, pumps and hoses. After introduction into the underground void, the cementitious slurry of this embodiment is allowed to set and form solid cement with approximately zero free water. As used herein, the term "approximately zero free water" means that after the cement hardens, there is either (i) absolutely no resulting free (excess or residual) water from the cementitious slurry, or (ii) a quantity of resulting free water that would be insufficient to allow dissolved formation solids originally carried in the produced water (used to form the cement) to migrate or leach into the surrounding earthen formation more than approximately four inches or a distance that would require environmental clean-up or remediation. In some embodiments, there may be absolutely zero free water.

In other embodiments, the cementitious slurry may instead be used to form useful cement for use in conventional underground well cementing, constructions projects, such as highways and bride construction, or other applications. The characteristics of the cementitious slurry of these embodiments is otherwise similar to or the same as the other embodiments described herein.

The Type I Portland cement and produced water may be mixed at any suitable ratio. For example, the Portland cement and produced water may be mixed at a desired ratio that, after placement and setting, will result in approximately zero free water. In some embodiments, the Type I Portland cement and produced water may be mixed at a ratio of approximately 14.0 ppg to form the slurry. In other embodiments, the Type I Portland cement and produced water may be mixed at a ratio of between approximately 115 ppg and approximately 14.5 ppg to form the slurry. In yet other embodiments, the mixture ratio may further vary. For example, the mixture ratio may depend on the type, manufacturer and quality of Type I Portland cement utilized and/or environmental conditions (e.g. temperature, pressure). For another example, if any additives are included in the cement formulation, the mixture ratio of the Type I Portland cement and produced water may vary.

The cementitious slurry of the present disclosure is allowed to set and form cement having any suitable compressive strength. In some embodiments, the cement may achieve a compressive strength of at least approximately 400 psi. For example, a compressive strength of at least 400 psi may be achieved in approximately 24 hours after introducing the cementitious slurry into the underground void (or other use). In other embodiments, the cement may achieve a compressive strength of at least approximately 500 psi within approximately 96 hours. In yet other embodiments, the compressive strength of the cement may be at least approximately 600 psi, 700 psi, 800 psi, 900 psi or another compressive strength below 400 psi or over 900 psi that is achieved in any suitable time. The desired compressive strength of the cementitious slurry of the present disclosure may vary depending upon various factors, such as, for example, the geographic location and/or may be dictated or recommended by governmental agencies, such as the Bureau of Land Management of the U.S. Department of the Interior.

The produced water used to form the cement may be provided from any suitable source. For example, the produced water may be recovered during hydrocarbon drilling, production, transportation, storage or related operations, as is and becomes further known. Some examples of instances that may generate produced water are well stimulation (e.g proppant flowback or stimulation flowback), acid flow back, initial well flow back, completions, acid mine drainage and pipeline maintenance. The produced water may be collected and transported using conventional equipment and techniques. Often, the produced water may include dissolved formation solids.

In an exemplary embodiment, during solidification of the cement slurry in an underground void, there is no, or minimal, leaching of dissolved formation solids from the produced water used to form the cement into the adjacent earth. In such instances, any dissolved formation solids originally present in the produced water are substantially or entirely contained within the hardened cement and substantially neutralized. For example, dissolved formation solids from the produced water would preferably leach or dissolve up to only up to approximately two inches or, in some instances, up to approximately four inches, into the adjacent earthen formation.

If desired, the cement mix may contain one or more additives. Some non-limiting examples of potential additives are set-accelerators, fluid loss control additives, anti-foam agents, waterproofing agents, dispersing agents and plasticizing agents. The additive(s), if included, may be selected from any conventionally known cement additives or additives otherwise known in the art. Preferably, the additives would not increase the free water remaining after hardening of the cement and may be included at any desired sufficient weight. For example, in some embodiments, additives may be present at less than one percent by weight with respect to total weight of the composition, but may be present at from 0.1 to 6 weight percent. The cementitious mixture, including any additives, are mixed using methods known in the art.

In particular, it may sometimes be desirable or necessary to include one or more additive to enhance the compressive strength of the cement and/or accelerate hardening of the cement. In some instances, one or more additives may be included to increase the compressive strength or hardening of the cement in a reasonable time, such as in 24, 48 or 96 hours or within another desired period of time (e.g., 28 days). For example, one or more set accelerant may be included, such as to achieve rapid strength gain or setting of the cement. In some embodiments, the accelerant may include one or more soluble inorganic salts, including but not limited to, chlorides, bromides, fluorides, carbonates, nitrites, nitrates thiosulfates, silicates, aluminates, and alkali hydroxides, or soluble organic compounds, such as thiocyanates, carboxylic acid salts, alkanolamine and calcium formate, soluble chloride salts (such as calcium chloride), triethanolamine, soluble formate salts (such as calcium formate), sodium hydroxide, potassium hydroxide, sodium carbonate, sodium sulfate, sodium sulfate, aluminum sulfate and iron sulfate.

The following examples are illustrative of one or more embodiments of the present disclosure. Other embodiments within the scope of the claims herein will be apparent to one skilled in the art from consideration of the description set forth herein. It is intended that the specification, together with the example(s), be considered exemplary only, with the scope and spirit of the invention being indicated by the claims which follow.

EXAMPLES

Examples 1-11

Mixtures were prepared by blending produced water with cement and/or additives to form, in each instance, a cementitious slurry that was allowed to cure at ambient temperature and pressure. An objective of the testing was to identify one or more cementitious slurries that could ultimately be pumped into an underground void and would cure into cement having a compressive strength of at least 400 psi in a reasonable time period (e.g. 48 hours) and produce less than 2 mls of free water.

The produced water was recovered from hydrocarbon wells drilled in the Marcellus field, Northeast Region of Pennsylvania, as defined by BJ Services Company, LLC. The produced water was measured to have a pH of 5.55, a specific gravity of 1.1419 and total dissolved solids of 185,525 parts-per-million. The water analysis results of the produced water showed concentrations of cations and anions in milligrams-per-liter of water are listed in Tables II and III below.

The analysis included free water testing and compressive strength testing pursuant to API Recommended Practice 10A, ISO 10426-1:2000 (23$^{rd}$ Edition, 2001) entitled "Specification for Cements and Materials for Well Cementing" ("APIRP10A"), and viscosity testing pursuant to ISO/DIS 10426-2 (© 2009) entitled "Petroleum and natural gas industries—"Cements and materials for well cementing—Part 2: Testing of well cements" ("ISO 10426-2"). Both APIRP10A and ISO 10426-2 are known in the industry and describe approved apparatus and methods for such testing.

The API free water testing was conducted pursuant to Section 8 of APIRP10A, during which the tested slurry was allowed to cure for 2 hours in a graduated cylinder (250 ml.) tilted at 45°. Any water present at the top of the cement after 2 hours was measured in milliliters (ml). The API destructive compressive strength testing was conducted pursuant to Section 9 of APIRP10A, during which the subject slurry was poured into 2'×2' brass or metal cubes. The slurry cubes were allowed to cure at ambient pressure in an 80° water bath for 24 and 96 hours. The cubes were placed on a press in which constant force was applied to the cubes. The force necessary to break the cubes was measured in pounds-per-square-inch and recorded in Table I below. The API rheology testing was conducted pursuant to Chapter 11 of ISO 10426-2, during which the rheological behavior of the slurries was determined at 600, 300, 200, 100, 6 and 3 rounds-per-minute on a rotational viscometer with an R1-B1 rotor-bob combination. The slurry calculations including fly ash were in compliance with Section 14 of ISO 10426-2.

Slurry Designs 1-4 involved mixtures of produced water with Lafarge brand Type I Portland Cement at different cement/produced water ratios. For example, in Slurry Design 1, 15.6 pounds of cement per gallon of produced water (6.251 gallons of produced water per sack of cement (gps)) was used. In Slurry Designs 1-3, while the free water testing indicated no residual free water, the viscosity testing indicated that the slurries were too thick to mix and would not be pumpable. However, the target parameters were achieved in Slurry Design 4, which utilized a mixture of produced water with Lafarge brand Type I Portland at a cement-to-water ratio of 14.0 ppg. This mixture produced zero free water, had a 24-hour ambient compressive strength value of 454 psi and a 96-hour ambient compressive strength value of 974 psi. The rheological readings indicate an acceptable thickness for delivery by pumping.

Slurry Designs 5 and 6 tested cement-free mixtures of produced water with Lafarge Type C fly ash. Slurry Design 5 used 100% fly ash while Slurry Design 6 included 10% A-11 lime. In each case, the compressive strength testing indicted that the slurry did not gain any recordable compressive strength within 96 hours. Consequently, testing was halted.

In Slurry Designs 7, 9 and 10, produced water was mixed with 50% fly ash and 50% cement at cement-to-water ratios of 14, 15 and 16 ppg, respectively. Slurry Design 7 utilized Portland Type I cement, while Slurry Designs 9 and 10 utilized Class H Joppa cement. Each mixture produced substantial free water, indicating the necessity for additional additives or a higher density of cement in order to reduce the free water. Since relatively low quantities of produced water were already used (e.g. only 4.083 gps of produced water was used for a density of 16.0 ppg in Slurry Design 10), testing was halted.

In Slurry Design 8, Class H Joppa cement was mixed with produced water at cement-to-water ratio of 15.0 ppg. This mixture produced 30 ml. of free water and testing was halted. Another Slurry Design (not shown in Table I) was tested using 100% sodium silicate at a produced water-to-sodium silicate ratio of 3:1. The sodium silicate was in the form of the presently available commercial product "Flow Guard C Preflush" offered by BJ Services Company, LLC. No crystallization was visually observed. Even if this mixture sufficiently hardened, substantial water would have resulted. Since the sodium silicate and produced water were not mixing well, the testing was halted.

Data generated in the tests is set forth in Table I below:

TABLE I

| | | Cement + Additives | | | | Destructive | | | | | | |
| | | A-11 | | | Free H$_2$O | C.S. | | Rheologies in Fann Deg | | | | |
| | | Lime | Water | Density | 45° | 24 hrs | 96 hrs | (rounds per min) | | | | |
| Slurry | Cement | (%) | (gps) | (ppg) | (ml, %) | (psi) | (psi) | 600 | 300 | 200 | 100 | 6 | 3 |
|---|---|---|---|---|---|---|---|---|---|---|---|---|---|
| 1 | Lafarge Type I | | 6.251 | 15.6 | 0 | | | Too Thick | | | | | |
| 2 | Lafarge Type I | | 7.33 | 15.0 | 0 | | | Too Thick | | | | | |
| 3 | Lafarge Type I | | 8.427 | 14.5 | 0 | | | Too Thick | | | | | |
| 4 | Lafarge Type I | | 9.769 | 14.0 | 0 | 454 | 974 | 82 | 75 | 67 | 58 | 42 | 26 |
| 5 | Fly Ash | | 5.26 | 14.0 | 0 | 0 | 0 | | | | | | |
| 6 | Fly Ash | 10 | 6.073 | 14.0 | 0 | 0 | 0 | | | | | | |
| 7 | 50:50 (Fly Ash: Type I) | | 7.515 | 14.0 | 30, 12 | 302 | | | | | | | |

TABLE I-continued

| | | Cement + Additives | | | | Destructive | | | | | | | |
|---|---|---|---|---|---|---|---|---|---|---|---|---|---|
| | | A-11 | | | Free H$_2$0 | C.S. | | Rheologies in Fann Deg | | | | | |
| | | Lime | Water | Density | 45° | 24 hrs | 96 hrs | | | (rounds per min) | | | |
| Slurry | Cement | (%) | (gps) | (ppg) | (ml, %) | (psi) | (psi) | 600 | 300 | 200 | 100 | 6 | 3 |
| 8 | Class H Joppa | | 7.33 | 15 | 40, 16 | | | 23 | 12 | 10 | 7 | 4 | 3 |
| 9 | 50:50 (Fly Ash: Class H) | | 5.486 | 15 | 22, 8.8 | | | 36 | 21 | 17 | 12 | 5 | 4 |
| 10 | 50:50 (Fly Ash: Class H) | | 4.083 | 16 | 13, 5.2 | | | 78 | 41 | 41 | 32 | 13 | 10 |

TABLE II

| Cations | Concentration (mg/L) |
|---|---|
| Calcium (Ca) | 16,140 |
| Barium (Ba) | 13,490 |
| Magnesium (Mg) | 1,004 |
| Iron (Fe) | 6 |
| Potassium (K) | 578 |
| Sodium (Na) | 43,680 |
| Boron (B) | 3 |
| Copper (Cu) | ND |
| Manganese (Mn) | 6 |
| Molybdenum (Mo) | ND |
| Phosphorus (P) | ND |
| Silica (Si) | ND |
| Strontium (Sr) | 9,180 |
| Zinc (Zn) | ND |
| Aluminum (Al) | ND |

TABLE III

| Anions | Concentration (mg/L) |
|---|---|
| Chloride | 109,000 |
| Sulfate | 0 |
| Carbonate | NA |
| Bicarbonate | 54 |

The Examples demonstrate that acceptable compressive strength and minimal resulting free water were attained by mixing produced water with Type I Portland Cement. In particular, LaFarge Type I Portland Cement blended with produced water at a ratio of 14.0 lbs of cement-per-gallon of produced water. Depending upon the quality, type and manufacture of Type I Portland cement used in a particular application, varying environmental conditions (e.g. temperature, pressure) and other factors, the cement/water ratio may vary to achieve the desired properties. To account for the potential influence of one or more such factor, it is believed to be reasonable to expand the proven density ratio of 14.0 ppg to an approximate range of 13.5-14.5 ppg.

Preferred embodiments of the present disclosure thus offer advantages over the prior art and are well adapted to carry out one or more of the objects of this disclosure. However, the present invention does not require each of the components and acts described above and is in no way limited to the above-described embodiments, methods of operation, variables, values or value ranges. Any one or more of the above components, features and processes may be employed in any suitable configuration without inclusion of other such components, features and processes. Moreover, the present invention includes additional features, capabilities, functions, methods, uses and applications that have not been specifically addressed herein but are, or will become, apparent from the description herein and claims.

The methods that are provided in or apparent from the description above or claimed herein, and any other methods which may fall within the scope of the appended claims, may be performed in any desired suitable order and are not necessarily limited to any sequence described herein or as may be listed in the appended claims. While exemplary embodiments of the invention have been shown and described, many variations, modifications and/or changes thereto are possible, contemplated by the patent applicant(s), within the scope of the appended claims, and may be made and used by one of ordinary skill in the art without departing from the spirit or teachings of the invention and scope of appended claims. Thus, all matter herein set forth or shown in the accompanying drawings should be interpreted as illustrative, and the scope of the disclosure and the appended claims should not be limited to the embodiments described and shown herein.

The invention claimed is:

1. A method of disposing of produced water recovered during hydrocarbon production operations at one or more hydrocarbon well, the method comprising:
    conducting hydrocarbon drilling operations at at least one hydrocarbon well;
    collecting produced water that includes dissolved formation solids and is generated during the hydrocarbon production operations at the hydrocarbon well;
    mixing Type I Portland cement with the produced water to form a cementitious slurry;
    delivering the cementitious slurry to an underground void at another location for disposal therein;
    introducing the cementitious slurry into the underground void;
    allowing the cementitious slurry to set and produce cement having a compressive strength of at least approximately 400 psi within approximately 48 hours; and
    during setting of the cementitious slurry, preventing leaching of formation solids from the produced water beyond approximately four inches into the earth surrounding the underground void.

2. The method of claim 1 further including mixing the Type I Portland cement and produced water to form a cementitious slurry having a thickness that allows the cementitious slurry to be pumped into an underground void.

3. The method of claim 2 further including allowing the cementitious slurry to set, the set cement having approximately zero free water.

4. The method of claim 3 further including recovering the produced water during fracturing operations.

5. The method of claim 3 further including mixing at least one accelerator into the cementitious slurry.

6. The method of claim 3 further including introducing the cementitious slurry into an abandoned underground mine shaft or mine cavity, and allowing the cementitious slurry to harden and form a cement that seals the mine shaft or mine cavity, and preventing fines from being released into the environment from the mine shaft or mine cavity.

7. The method of claim 1 further including allowing the cementitious slurry to set and form solid cement having a compressive strength of at least approximately 400 psi within approximately 24 hours.

8. The method of claim 7 further including allowing the cementitious slurry to set and form solid cement with approximately zero free water.

9. The method of claim 1 further including allowing the cementitious slurry to set and form solid cement having a compressive strength of at least approximately 500 psi within approximately 96 hours.

10. The method of claim 9 further including allowing the cementitious slurry to set and form solid cement with absolutely zero free water.

11. The method of claim 1 further including allowing the cementitious slurry to set, the set cement having a compressive strength of at least approximately 600 psi within approximately 96 hours.

12. The method of claim 1 further including allowing the cementitious slurry to set, the set cement having a compressive strength of at least approximately 800 psi.

13. A method of disposing of produced water recovered during hydrocarbon production operations at one or more hydrocarbon wells, the method comprising:

conducting hydrocarbon drilling operations at at least one hydrocarbon well;

at the hydrocarbon well, collecting the produced water generated during hydrocarbon production operations;

mixing Type I Portland cement with the produced water to form a cementitious slurry having a thickness that allows the cementitious slurry to be pumped into an underground void at another location and form a solid cement with approximately zero free water;

identifying an underground void at another location from the hydrocarbon well;

pumping the cementitious slurry into the underground void; and allowing the cementitious slurry to set and form solid cement with approximately zero free water.

14. The method of claim 13 wherein the produced water carries one or more dissolved formation solids, further including during setting of the cementitious slurry, disallowing leaching of formation solids in the produced water more than approximately four inches deep into the earth surrounding the underground void.

15. The method of claim 13 further including allowing the cementitious slurry to set and form solid cement with absolutely zero free water.

16. The method of claim 13 further including mixing Type I Portland cement with produced water at a ratio of between approximately 13.5 ppg and approximately 14.5 ppg to form a cementitious slurry and allowing the cementitious slurry to set and form solid cement having a compressive strength of at least approximately 500 psi.

17. The method of claim 13 further including mixing Type I Portland cement with produced water at a ratio of approximately 14.0 ppg to form a cementitious slurry and allowing the cementitious slurry to set and form solid cement having a compressive strength of at least approximately 400 psi.

18. The method of claim 13 further including allowing the cementitious slurry to set and form solid cement having a compressive strength of at least approximately 700 psi.

19. The method of claim 13 further including allowing the cementitious slurry to set and form solid cement having a compressive strength of at least approximately 900 psi.

20. The method of claim 13 wherein the underground void is an underground coal mine area, further including allowing the solid cement to seal the underground coal mine area.

\* \* \* \* \*